INVENTOR.
JAMES HOWARD HUFFORD
BY
Meyer, Tilberry & Body
ATTORNEYS

United States Patent Office
3,433,971
Patented Mar. 18, 1969

3,433,971
AC-DC COMMON LOAD SWITCH
James Howard Hufford, Moline, Ill., assignor to E. W. Bliss Company, Canton, Ohio, a corporation of Delaware
Filed Jan. 9, 1967, Ser. No. 608,034
U.S. Cl. 307—18          5 Claims
Int. Cl. H02j 3/38, 7/34, 3/02

ABSTRACT OF THE DISCLOSURE

An AC load and an alternating current voltage source are connected together in series across the input circuit of a full wave bridge rectifier circuit. A DC load and a direct current voltage source are connected together in series across the output circuit of the bridge rectifier circuit. A normally open switch, such as a pair of relay contacts or a transistor, is commonly connected in parallel across the DC load series circuit, as well as across the output circuit of the bridge rectifier circuit. Thus, when the switch is closed, the DC load and the AC load are simultaneously energized by the direct current voltage source and the alternating current voltage source, respectively.

---

The present invention is directed toward the art of load control and, more particularly, to the use of a common switch for simultaneously energizing an AC load by an alternating current voltage source, and a DC load by a direct current voltage source.

Although the invention is particularly applicable in conjunction with simultaneously energizing both an AC load and a DC load, it is not limited thereto as it may be useful in other applications.

Normally, when two load circuits each having separate power sources are to be switched simultaneously, a double pole switch is used, with one pole switching each circuit. However, if the two poles do not switch together, because of misadjustment or failure of one of the poles, then the circuits will not switch simultaneously.

The present invention is directed toward a circuit including a common switch for the two load circuits, wherein the switch includes a single pole, or is a transistor, and which serves to respectively switch the separate power sources across the two loads, thereby overcoming the noted disadvantages, as well as others, of previous circuits for simultaneously switching separate power sources across two load circuits.

In accordance with the present invention, the circuitry includes: an AC load and an alternating current voltage source connected together in series across an input circuit of a full wave bridge rectifier circuit, having its output connected across a series circuit including a DC load and a direct current voltage source; and, common switching means, such as a pair of relay contacts or a transistor, having a normal open circuit condition and an actuated closed circuit condition, and commonly connected in parallel with the series circuit as well as across the output circuit of the rectifier circuit, whereby when the switching means is closed the DC load and the AC load are respectively energized by the direct current voltage source and the alternating current voltage source.

In accordance with a more limited aspect of the present invention, a pair of diodes are located in the series circuit on opposite sides of the DC load, and are poled so as to permit current flow in only one direction through the DC load.

The primary object of the present invention is to provide a circuit having a single common switching means for substantially simultaneously completing energizing circuits between a direct current voltage source and a direct current load, as well as between an alternating current voltage source and an alternating current load.

It is a still further object of the present invention to provide a relatively uncomplicated circuit for connecting two voltage sources with two loads, which circuit is relatively inexpensive to manufacture and economical in operation.

In accordance with a still further object of the present invention, the common switching means may take the form of a pair of relay contacts or, if desired, solid state means, such as a transistor, for small unit size and economy of operation.

The foregoing and other objects and advantages of the invention will become apparent from the following description of the preferred embodiments of the invention as read in connection with the accompanying drawings in which.

Figure 1:
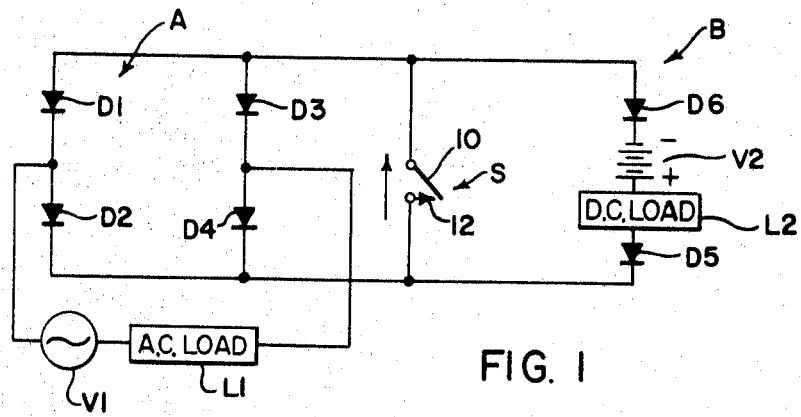
FIGURE 1 is a schematic circuit illustrating one embodiment of the invention.

Referring now to the drawings, and more particularly to FIGURE 1, there is shown an embodiment of the invention which generally comprises: a full wave bridge rectifier circuit A; an alternating current voltage source V1 and an AC load L1, connected together in series across the input circuit of circuit A; a series circuit B including diodes D5, D6, direct current voltage source V2 and a DC load L2, connected across the output circuit of circuit A; and, a common switching means S connected in parallel with the series circuit, as well as across the output circuit of rectifier circuit A.

The full wave bridge rectifier circuit A includes diodes D1, D2, D3 and D4, poled as shown in FIGURE 1. The input circuit of circuit A is taken between the junction of diodes D1 and D2 and the junction of diodes D3 and D4, and is connected across a series circuit including source V1 and load L1. The output circuit of circuit A is taken between the junction of diodes D1 and D3 and the junction of diodes D2 and D4. The switching means S is connected across the output circuit of circuit A and is shown in FIGURE 1 as being normally open contacts, such as a pair of relay contacts, and including a movable contact 10 and a stationary contact 12. Diodes D5 and D6, in series circuit B, are located on opposite sides of load L2, and poled as shown in FIGURE 1, so that current flows in only one direction through the load in acordance with the polarity of source V2.

In operation, upon closure of switch S a circuit is completed for energizing load L1 by source V1, and a circuit is completed for energizing load L2 by source V2. More particularly, during the first half cycle of operation of source V1, current flows through diode D2 and thence through switch S, in the direction of the arrow, through diode D3 and then through load L1 to the other side of source V1. It will be noted that diode D5 prevents this current flow from reaching the DC load L2. During the next half cycle of operation of source V1, current flows through load L1 and thence through diode D4, through switch S and thence through diode D1 to the opposite side of source V1. Again, diode D5 has prevented this current from reaching load L2. Also, when switch S2 was closed a path was completed, whereby current flows from the positive side of source V2 and hence through load L2, diode L5, switch S, in the direction of the arrow, and through diode D6 to the negative side of source V2. Accordingly, the single pole switch S has served, when closed, to complete energizing circuits, whereby load L1 and load L2 are simultaneously energized by sources V1 and V2, respectively.

Figure 2:
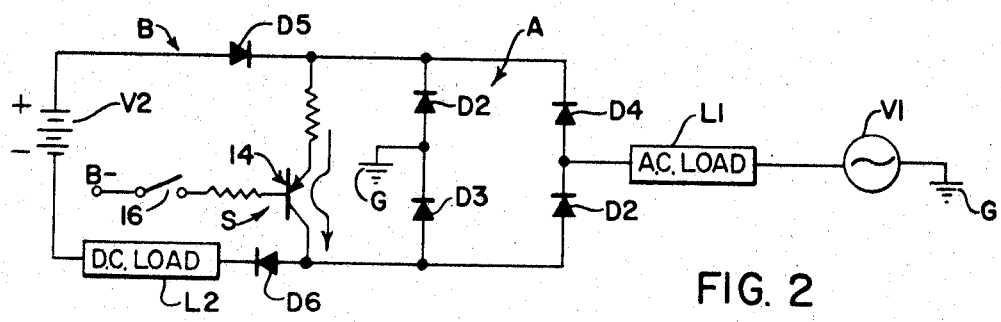
FIGURE 2 is a schematic circuit illustrating a second embodiment of the invention; and, FIGURE 3 is a schematic drawing illustrating a third embodiment of the invention.

Referring now to FIGURE 2, there is shown a second embodiment of the invention. This embodiment is quite similar to that as shown in FIGURE 1 and, accordingly, like character references are used in both figures to identify like components. In FIGURE 2, however, the common switching means S takes the form of a PNP transistor 14, having its emitter and collector electrodes connected across the output circuit of rectifier circuit A. The base of transistor 14 is connected through a normally open switch 16 to a B— voltage supply source. Also, the junction of diodes D2 and D3 is connected to ground G. The operation of this embodiment is quite similar to that shown in FIGURE 1, and commences upon closure of switch 16. This applies forward biasing potential to transistor 14, whereupon current flows through the emitter to collector circuit of transistor 14, in the direction of the arrow, in the same manner as current flows through switching means S in FIGURE 1 of the embodiment discussed above.

Figure 3:
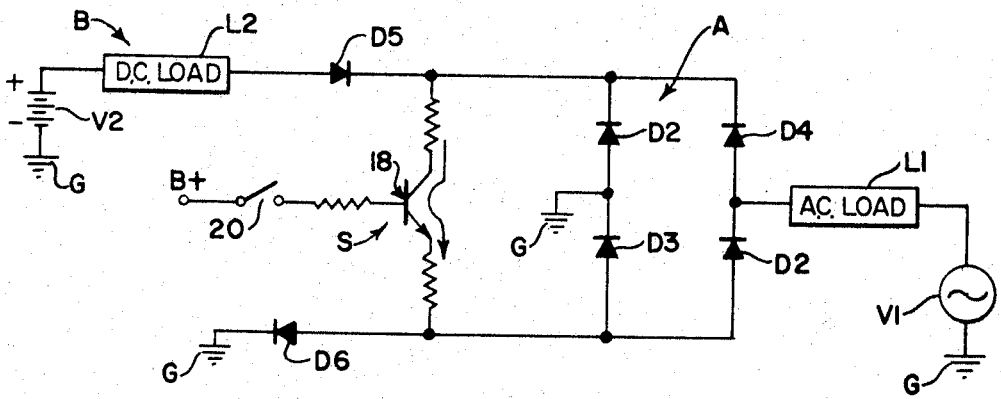

Refering now to FIGURE 3, there is shown a third embodiment of the invention which is quite similar to that as shown in FIGURES 1 and 2 and, accordingly, like components are identified with like character references. In FIGURE 3, however, the common switching means S is an NPN transistor 18, having its collector and emitter electrodes connected across the output circuit of rectifier circuit A, and its base connected through a normally open switch 20 to a B+ voltage supply source. Also, the negative side of source V2 and the cathode of diode D6 are connected to ground G. The operation of the embodiment shown in FIGURE 3 is quite similar to that discussed previously with respect to the embodiments shown in FIGURES 1 and 2, and commences upon closure of switch 20. This applies forward biasing potential to transistor 18, whereupon current flows through the collector to emitter circuit of transistor 18, in the direction of the arrow, in the same manner as current flows through the common switching means S of FIGURE 1.

The invention has been described in connection with three embodiments, but is not to be limited to same. Various modifications may be made without departing from the scope and spirit of the present invention as defined by the appended claims.

Having thus described my invention, I claim:

1. A circuit for substantially simultaneously energizing first and second loads by first and second voltage sources, respectively, with common switching means and comprising:
    a full wave bridge rectifier circuit having an input circuit and an output circuit;
    an AC load and an alternating current voltage source connected together in series across said input circuit;
    a series circuit including a DC load and a direct current voltage source connected together in series across said output circuit; and
    common switching means having a normal open circuit condition and an actuated closed circuit condition, said switching means being commonly connected in parallel with said series circuit and across said output circuit, whereby when said switching means is closed said DC load and said AC load are respectively energized by said direct current voltage source and said alternating current voltage source.

2. A circuit as set forth in claim 1, including a pair of diodes located in said series circuit on opposite sides of said DC load and poled to permit current flow in only one direction through said DC load.

3. A circuit as set forth in claim 2, wherein said switching means is a normally open switch having a stationary contact and a movable contact.

4. A circuit as set forth in claim 2, wherein said switching means is an electronic control device having first, second and control electrodes; said first and second electrodes being connected across said output circuit.

5. A circuit as set forth in claim 2, wherein said switching means is a transistor having emitter, collector and base electrodes, said emitter and collector electrodes being connected across said output circuit.

References Cited

UNITED STATES PATENTS 3,317,810   5/1967   Kiyoshi Inoue _____ 307—26 X

ROBERT K. SCHAEFER, Primary Examiner.

H. J. HOHAUSER, Assistant Examiner.

U.S. Cl. X.R.

307—22, 112